United States Patent [19]

Fournier

[11] 4,244,500
[45] Jan. 13, 1981

[54] VIEWING SUPPORT

[76] Inventor: Raymond Fournier, 8609 St-Denis, Montreal, Quebec, Canada, H2P 2H4

[21] Appl. No.: 49,125

[22] Filed: Jun. 18, 1979

[51] Int. Cl.$^3$ .............................................. G03B 17/00
[52] U.S. Cl. .................................... 224/265; 352/243;
354/81; 354/293; 224/201; 224/908
[58] Field of Search .......................... 354/81, 82, 293;
352/243; 224/201, 265, 266, 908; 248/226.2, 226.5

[56] References Cited

U.S. PATENT DOCUMENTS

| 817,207 | 4/1906 | Wheeler | 354/82 |
|---|---|---|---|
| 1,483,588 | 2/1924 | Meyers et al. | 248/226.2 |
| 2,806,416 | 9/1957 | Jones | 354/82 |
| 3,266,403 | 8/1966 | Anderson | 354/82 |
| 3,586,278 | 6/1971 | Simons | 354/81 |
| 3,741,092 | 6/1973 | Bohanec | 224/908 |

FOREIGN PATENT DOCUMENTS 232123  1/1961  Australia .............................. 248/226.5

Primary Examiner—Monroe H. Hayes

[57] ABSTRACT

A viewing support comprising a pair of support arms pivotably connected together at one end. One arm is adapted to be mounted over a shoulder of a person while the other arm is adapted to rest against the person's torso beneath the shoulder. A mounting pad is provided in the vicinity of the pivot connection of the arms for mounting a viewing device, such as a camera, thereon.

3 Claims, 4 Drawing Figures

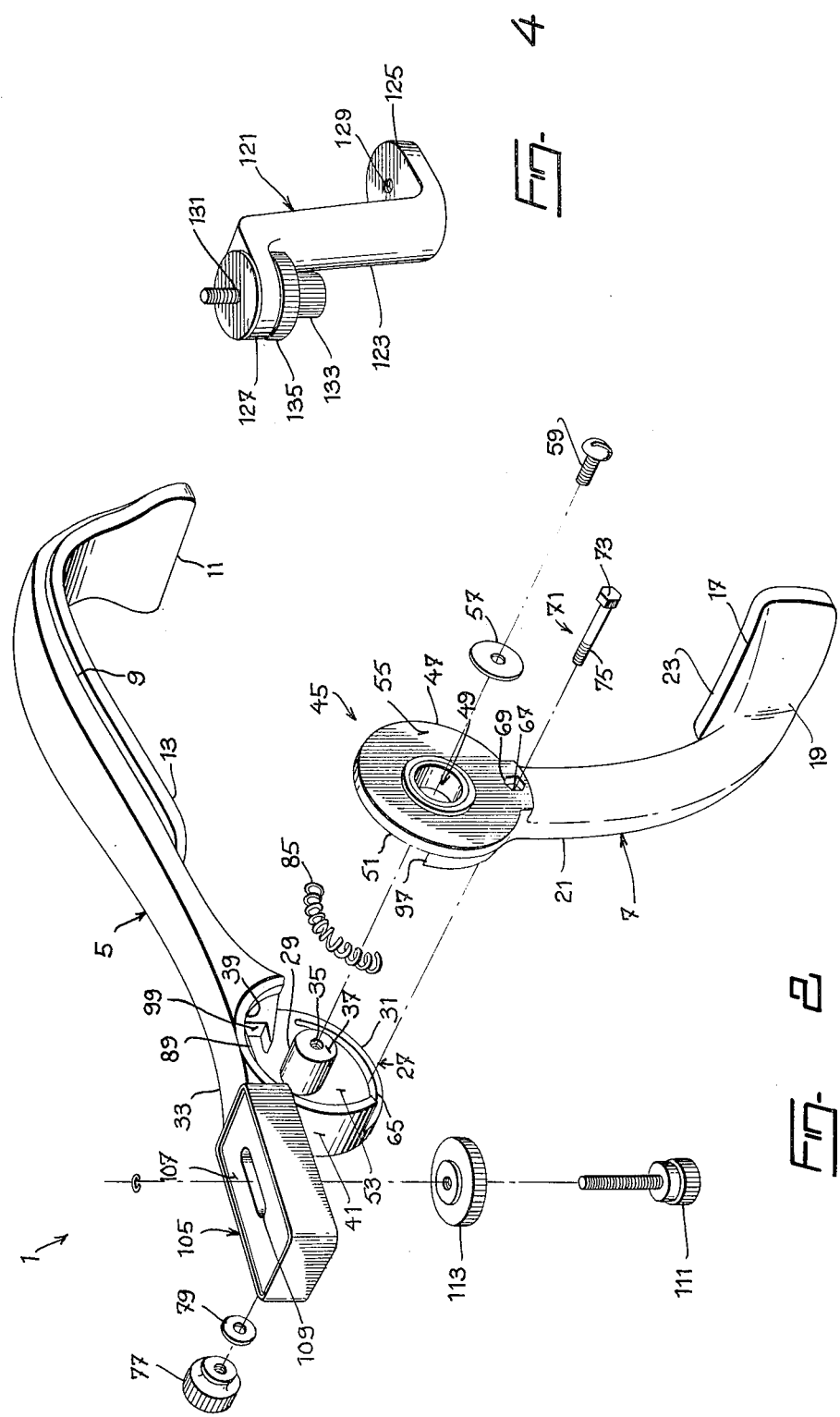

VIEWING SUPPORT

The present invention relates to a viewing support and more particularly, to a camera support.

When using a camera, particularly a movie camera, which is heavy, for any length of time, difficulty is encountered in keeping the camera still while taking pictures. If the camera moves during picture taking, the pictures are not as sharp as desired. It is known to provide ground supports for cameras, such as tripods, on which a camera may be mounted to take pictures. However, when a film maker must move about often between takes while using a camera, handling a tripod becomes awkward.

It is an object of the present invention to provide a support for a viewing device, such as a more camera, which support is easy to handle, while providing proper support.

It is another object of the present invention to provide which is simple in construction and operation.

In accordance with the present invention, a viewing support is provided which is constructed to be mounted on the upper body of the operator of a viewing device in a position to support the viewing device at a viewing position. The support provides a steady viewing platform without being awkward to handle, and can be carried by the operator without unduly tiring the operator. The support is adjustable to make mounting easier. In addition, the support is compact when in the operative position and can be folded to a more compact storage position when not needed.

The support comprises two support arms joined together at one end. One support member is adapted to fit over a shoulder of the operator. The other support member is adapted at its other end to bear against the front of the lower torso of the operator beneath the shoulder. When the support is mounted on the operator, the support members are in a generally upright plane with the one support member hooked over the shoulder and the other support member pressed against the torso.

Means are provided for pivotably connecting the arms together at the one end, with the arms locked in the mounted position. The pivot connection between the arms is located just in front of the shoulder when the support is mounted.

A viewing device mounting pad is provided on the support in the vicinity of the pivot connection to support the viewing device thereon generally at eye level when the support is mounted in position.

The support arms are well padded where they contact the viewer and the arms fold together about the pivot connection for compact storage. The lower support arm provides a handle portion below the pivot connection to be used by the viewer to steady the support, and thus the viewing device, if needed.

The invention is more particularly directed toward a viewing support for a viewing device comprising a first support arm adapted to have a portion rest over a viewer's shoulder and a second support arm adapted to have a portion rest against a viewer's torso beneath the shoulder. The support arms are pivotably joined together at one end so that they may be adjusted relative to each other. Means are provided on the first support arm, in the vicinity of the joining means, for mounting the viewing device.

Locking means can be provided at the pivot means for locking the arms together in their adjusted position. Spring means can also be provided for biasing the opposite ends of the arms together about the pivot means while the arms are unlocked.

The invention will now be described in detail having reference to the accompanying drawings in which:

FIG. 2 is an exploded view of the support;

Figure 1:
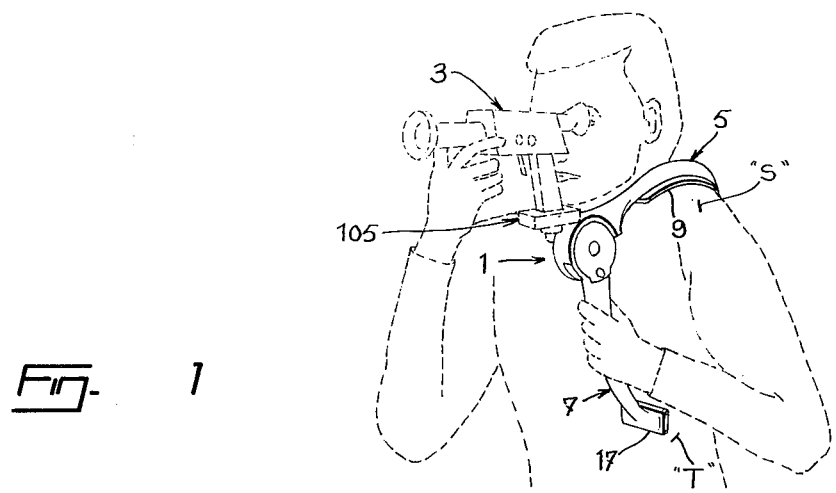
FIG. 1 is a view showing the support in use.
Figure 3:
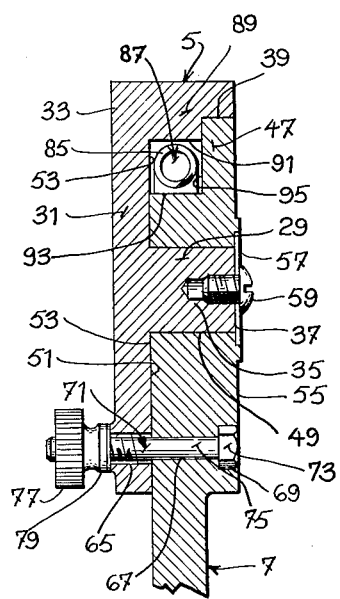

FIG. 3 appearing on the same sheet of drawings as FIG. 1 is a cross-section view of the pivot joint in the support; and FIG. 4 is a perspective view of an accessory for the support.

The viewing support 1 shown in FIG. 1 is used for supporting a movie camera 3. The support 1 comprises two support arms 5 and 7.

The first support arm 5 has a portion 9, adapted to rest over a person's shoulder "S". This rest portion 9 of the support arm 5 comprises the rear part of the arm and includes one end 11 of the same. The rest portion 9 is flat in cross-section and curved along its length to fit over a shoulder. The inner, concave, shoulder-bearing surface of the rest portion 9 has a cushion pad 13 fastened thereto by suitable means, such as an adhesive.

The second support arm 7 also has a portion adapted to rest against the lower torso "T" of the person. This rest portion comprises a short cross-bar 17 centrally fastened to the bottom end 19 of the inwardly curved, main body portion 21 of second arm 7. A resilient pad 23 is fastened to the out-wardly-facing surface of the cross-bar 17 opposite the main body portion 21. The cross-bar 17 is adapted to bear against the torso "T" of the person, below the shoulder, when the support is in place.

The support arms 5 and 7 are connected together at one end. They could be fixedly connected together if the support is custom built for a person. Preferably however the arms are pivotably connected together at the one end by pivot means.

Referring particularly to FIG. 2, the pivot means 27 on first arm 5, is located forwardly of the rest portion 9 and includes a stub shaft 29 fastened at one end to a part circular wall 31 extending down from one side 33 of arm 5. The shaft 29 extends perpendicularly from the center of wall 31 under the arm 5. A tapped hole 35 extends axially into the shaft 29 from its free end 37. The bottom surface 39 of the first arm 5 at the pivot means 27 is curved concentrically about the shaft 29. A curved skirt 41 is provided, projecting inwardly from the edge of the circular wall 31, concentric about the shaft 29 to form a part-circular continuation of part-circular surface 39.

Pivot means 45 are provided on the upper end of the second arm 7 for use in pivotably connecting the second arm 7 to the pivot means 27 of first arm 5. The pivot means 45 comprises a circular mounting plate 47 extending up from the top end of the second support arm 7. The plate 47 has a central through bore 49 on which the stub shaft 29 on first arm 5 is rotatably mounted. When the shaft 29 is mounted in bore 49, the circular plate 47 fits snugly within the curved surface 39 and the curved skirt 41. The inner surface 51 of the plate 47 lies flush against the inner surface 53 of circular support wall 31, and the free end 37 of the shaft 29 lies flush with the outer surface 55 of the plate 47. A washer 57 is fastened to one end of the shaft 29 with a screw 59 threaded into the hole 35. The washer 57 overlies the outer surface 55 of the plate 47 and, with the screw 59, serves to hold the arms 5 and 7 together, pivotably connected by the shaft 29 and bore 49. The arms 5 and 7 can be moved relative to each other about shaft 29 to properly position the support on a person.

Locking means are provided for locking the support arms together in the desired support position. The locking means include a part-circular slot 65 in the lower portion of the support wall 31 which slot is concentric about the stub shaft 29. A through hole 67 is provided in the plate 47 parallel to the bore 49 and positioned to be aligned with the slot 65 when the plate 49 is mounted on the shaft 29. A hexagon shaped enlargement 69 is provided at the outer end of hole 67 adjacent outer surface 55 of the plate. A hexagon headed bolt 71 is mounted in hole 67, with its head 73 fitting snugly in the enlargement 69 and its threaded shank 75 passing through the slot 65 in the wall 31. A locking nut 77 is screwed onto the shank 75 and a washer 79 is provided between the nut 77 and the outer surface of the wall 31. The locking nut 77 is loosened to allow the support arms to move relative to each oher about the shaft 29. When the arms are moved, the bolt 71 slides in slot 65. When the arms are in the desired support position, the nut 77 is tightened to lock the arms together.

To assist in moving the support arms 5 and 7 to the desired support position, spring means can be provided to bias the free ends of the arms together. These spring means comprise a compression spring 85 mounted in a part-circular chamber 87 concentric about shaft 29. The chamber 87 is formed in part by providing a shoulder 89 extending radially inwardly on the curved surface 39 adjacent the wall 31. The inner partcircular surface 91 of the shoulder 89 defines the outer wall of the chamber 87. The inner wall of the chamber 87 is formed by cutting away a top, inner portion of the plate 47 to form a curved step 93. The side walls of the chamber 87 are provided by part of the inner surface 53 of the circular wall 31 and by a side surface 95 formed in providing a step 93. The chamber 87 is closed at one end by a radial wall 97 at the end of the step 93 and at its other end by a wall 99 formed in shoulder 89. The spring 89 sits in the chamber 87 compressed between the end walls 97 and 99 and biases the free ends of support arms 5 and 7 together, when the lock nut 77 is loose, to properly fit the support on a person.

A mounting pad 105, forming an integral part of the support arm 5, projects past the pivot means 27. The pad 105 has an upper, flat mounting surface 107 on which a camera or another viewer device is positioned. An elongated slot 109 is provided in the pad. A fastening bolt 111 is passed up through the slot 109 in the pad 105 for threading into a fastening hole in the base of a camera to fasten it to the pad. A lock nut 113 could be provided through which the bolt 111 is threaded before passing through the slot 109.

Some cameras have a mounting hole located forward of and above the camera base. For cameras of this type an accessory device 121 can be provided for mounting the camera on the pad. The accessory device 121, as shown in FIG. 4, comprises an upright post 123 having a bottom flange 125 and a top flange 127 extending laterally from the post in opposite directions. The bottom flange 125 has a taped hole 129 therein which receives bolt 111 to fasten the post 123 onto the mounting pad 105. The top flange 127 has a threaded hole 131 therein through which a second fastening bolt 133 is threaded from the bottom of the flange 127 to fasten a camera to the top of the flange. A second locking nut 135 can be provided as well.

When the support is mounted on a person, the rear portion of the upper support arm 5 is hooked over the shoulder to prevent the support from pivoting off the top of shoulder. The curved main body portion 21 of lower support arm 7 provides a handgrip area as shown in FIG. 1 to help maintain the support in position if needed. Most of the camera weight is carried by the shoulder however so that little weight is carried by a person's hand in helping keep the support in position.

When the support is not needed, the nut 77 can be loosened and arms 5 and 7 can be folded together about the shaft 29 to provide a compact storage position.

The support is particularly suited for use with a camera. However it could also be used for supporting other viewing devices such as binoculars.

I claim:

1. A viewing support adapted to be mounted on the upper body of an operator to provide a steady platform for a viewing device, said support comprising:

a first support arm having a rest portion terminating in a rear hooked portion adapted to engage over and rest upon an operator's shoulder, said hooked portion being flat in cross section and curved along its length to define an inner concave bearing surface that fits over said shoulder when the support is in place;

a second support arm having a downwardly and inwardly curved main body portion terminating at its lower end in a rest portion adapted to rest against a selected place on the front of the operator's torso, said rest portion comprising a short crossbar centrally fastened to the lower end of said main body portion and adapted to bear against said selected place when the support is in place on the operator, and said selected place being spaced downwardly on the torso from the shoulder;

means for pivotally connecting said first support arm and said second support arm directly to each other so that said support arms can be moved relative to each other to adjust the point where said rest portion engages the operator's torso and the angular relationship between said support arms, said connecting means comprising first pivot means mounted forwardly on the rest portion of said first support arm and second pivot means mounted on the upper end of said main body portion of said second support arm, one of said pivot means comprising a part-circular wall extending from its associated support arm and having a stub shaft projecting therefrom, and the other of said pivot means comprising a circular mounting plate having a central bore therein for receiving said stub shaft, said circular mounting plate being engageable with said part-circular wall;

means for releasably locking said first and said second support arms in a desired fixed angular relationship to each other, said locking means comprising a part-circular slot in said part-circular wall, said slot being concentric about said stub shaft and said circular mounting plate having a through hole therein aligned with said slot, a locking bolt passing through said aligned hole and slot, and a locking nut screwable onto said bolt for releasably locking said first and said second support arms together; and platform means on the front end of said first support arm, for mounting the viewing device.

2. A viewing support as recited in claim 1, further including:

spring means arranged to bias said first and second support arms toward each other about said stub shaft, said spring means including wall means on said part-circular wall and said mounting plate for defining a part-circular chamber disposed concentrically about said stub shaft, and a compression spring received within said part-circular chamber.

3. A viewing support as recited in claim 1, further including:

a support post;

means for detachably connecting said support post to said platform means; and means on said support post for detachably connecting a viewing device thereto.

* * * * *